(12) United States Patent
Liu (10) Patent No.: US 10,622,935 B1
(45) Date of Patent: Apr. 14, 2020

(54) RAIL-MOUNTED BOTTOM CLAMP FOR MOUNTING SOLAR PANELS TO ROOFS AND THE LIKE

(71) Applicant: Sunmodo Corporation, Vancouver, WA (US)

(72) Inventor: Jun Liu, Camas, WA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 16/377,176

(22) Filed: Apr. 6, 2019

(51) Int. Cl.
*H02S 20/23* (2014.01)
*H02S 30/10* (2014.01)

(52) U.S. Cl.
CPC .............. *H02S 20/23* (2014.12); *H02S 30/10* (2014.12)

(58) Field of Classification Search
CPC .......... H02S 20/00; H02S 20/22; H02S 20/23; H02S 20/24; H02S 20/30; H02S 30/10
See application file for complete search history.

(56) References Cited

U.S. PATENT DOCUMENTS

| | | | |
|---|---|---|---|
| 1,486,158 A | 6/1922 | Price | |
| 4,676,687 A * | 6/1987 | Koffler | A61G 7/0507 248/228.6 |
| 4,901,963 A * | 2/1990 | Yoder | B25B 5/103 24/489 |
| 6,032,939 A | 3/2000 | Chen | |
| 6,959,517 B2 * | 11/2005 | Poddany | E06B 1/6015 52/173.3 |
| 7,634,875 B2 | 12/2009 | Genschorek | |
| 8,806,813 B2 * | 8/2014 | Plaisted | H01R 4/64 52/173.3 |
| 9,011,034 B2 * | 4/2015 | Liu | F16B 2/065 403/256 |
| 9,331,629 B2 * | 5/2016 | Cheung | H02S 20/23 |
| 9,893,677 B1 | 2/2018 | Liu | |
| 10,205,418 B2 * | 2/2019 | Nayar | F24S 25/634 |
| 10,218,305 B1 * | 2/2019 | Schrock | F16B 2/10 |
| 10,256,768 B2 * | 4/2019 | Owen | H02S 20/10 |
| 2014/0341645 A1 * | 11/2014 | Liu | F16B 2/065 403/311 |
| 2015/0183066 A1 * | 7/2015 | Lippert | F24S 25/35 29/428 |
| 2016/0054030 A1 | 2/2016 | Ilzhofer | |

(Continued)

FOREIGN PATENT DOCUMENTS

DE 102010004117 A1 7/2010

*Primary Examiner* — Patrick D Hawn
(74) *Attorney, Agent, or Firm* — Stone Creek Services LLC; Alan M Flum (57) ABSTRACT

A solar panel bottom clamp assembly that secures the underside of a solar panel frame (i.e., the return flange of the solar panel) to a mounting rail. The mounting rail being securable to a mounting surface such as a roof. The solar panel bottom clamp assembly includes a solar panel bottom clamp and a threaded fastener. The solar panel bottom clamp includes a lower body and an upper body. The lower body is slidable within a slot positioned lengthwise along the side of the mounting rail. The upper body extends from the lower body and over the return flange. The threaded fastener being threadable diagonally through the lower body, secures the solar panel to the mounting rail by impinging against the slot which pushes the lower body downward and the upper body against the return flange.

12 Claims, 9 Drawing Sheets

(56) References Cited

U.S. PATENT DOCUMENTS

2016/0111997 A1* 4/2016 Ganshaw ............ H02S 20/23
                                                    248/224.7
2016/0261225 A1   9/2016 Paponneau
2016/0282018 A1   9/2016 Ash et al.

* cited by examiner

RAIL-MOUNTED BOTTOM CLAMP FOR MOUNTING SOLAR PANELS TO ROOFS AND THE LIKE

BACKGROUND

This disclosure relates to mounting solar panels using solar panel bottom clamps to mounting surfaces, such as roofs.

Solar panels, such as solar photovoltaic panels, can mount to various types of mounting structures. These include roof structures, such as pitched shingle roofs, tile roofs, metal roofs, or concrete roofs. Solar panels often mount together in rows and columns known as solar panel arrays. Solar panels and solar panel arrays commonly secure to mounting rails that typically span the length of one or more solar panels. Mounting brackets typically secure the mounting rails to the roof structure.

The solar panels secure to the mounting rail using either over-the-panel clamps or under-the-panel clamps. Over-the-panel clamps, called mid-clamps, mount between two solar panels. Over-the-panel clamps, known as end-clamps, mount at an outside perimeter or end of an array of solar panels. Mid-clamps and end-clamps secure the top of the solar panel frame to the mounting rail by a mounting bracket, by creating clamping pressure between the top of the solar panel frame and the mounting structure.

Under-the-panel clamps secure the underside of the solar panel frame lip, or return flange, to the mounting rail. Under-the-panel clamps are also known as solar panel bottom clamps. Solar panel bottom clamps can create a cleaner appearance as compared with mid-clamps and end-clamps because most of the bottom clamp is hidden and does not cover the top of the solar panel frame. Finally, some solar panel mounting systems use a combination of over-the-panel clamps and under-the-panel clamps. For example, mid-clamps between solar panels in combination with bottom clamps at the perimeter edges of the solar panel array.

SUMMARY

The inventor's company manufactures solar panel roof racking systems. The inventor noted several challenges faced by solar panel system installers when installing solar panel bottom clamps. These challenges include installation complexity, high material costs, lost time at job site from missing parts, and logistic challenges because different solar panel frames may require different clamps. The inventor set out to develop a solar panel bottom clamp that attempts to address these challenges.

The inventor developed a solar panel bottom clamp that he believes is easier to install than many of the previous bottom clamp designs, can be preinstalled on mounting rails at the warehouse or factory to prevent missing parts, and can be applied across a wide range of standard solar panel frames. In addition, in one embodiment, the solar panel clamp can function as a universal bottom clamp where it can be used between solar panels and the end of panels.

The solar panel bottom clamp assembly can include as few as two parts, a solar panel bottom clamp and a threaded fastener. In one embodiment, the solar panel bottom clamp includes a lower body, a mid-body projecting upward from the lower body, and an upper body projecting transversely from the mid-body. The lower body is structured to captively slide within a rail slot that is positioned lengthwise along the side of a mounting rail for mounting solar panels to roofs and the like. With the lower body slidably captive within a rail slot indented lengthwise along the side of the mounting rail, the upper body becomes positioned above the top of the mounting rail. The lower body is designed to accept the threaded fastener diagonally upward from front to back. The back of the lower body faces the interior of the rail slot and the front of the lower body faces the away from the rail slot toward the outside environment. With the threaded fastener loosened, the solar panel bottom clamp can be lifted upward and a portion of the upper body can be slid under the return flange of the solar panel. Alternatively, the return flange can be slid under the solar panel bottom clamp. With the return flange positioned under a portion of the upper portion of the solar panel bottom clamp, the threaded fastener can be tightened against the rail slot causing the upper body move downward and engage the return flange. This secures the return flange between the top of the mounting rail and the upper body of the solar panel bottom clamp and thus fixes the solar panel to the mounting rail. The shape of the lower body of the solar panel bottom clamp can vary in manner that allows it to remain slidably captive within the rail slot and allows tightening of the threaded fastener to lower the solar panel bottom clamp relative to the mounting rail and create a clamping force between the upper body, the return flange, and the mounting rail. For example, the lower body can be sized so that there is a vertical gap between the lower body and the top and bottom interior walls of the mounting rail. In addition, the lower body can be shaped to provide a diagonal gap between the lower body and the portion of the mounting rail that engages the threaded fastener.

Local and national regulatory agencies often require solar panels and their mounting components to be electrically grounded for safety. Solar panel frames as well as solar panel mounting components such as rails and clamps are often made out of aluminum. Aluminum develops a hard oxide coating that is an electrical insulator. The solar panel bottom clamp can optionally include one or more second fasteners used to create an electrical connection between the solar panel bottom clamp and the solar panel. The second fasteners include fastener ends passing through the bottom of the upper body. As the threaded fastener is tightened against the rail slot, the fastener end of the second fastener pierces the top surface of the return flange. If both the solar panel frame and the solar panel bottom clamp are made of an electrically conductive material, then the second fastener will create an electrical connection between the solar panel bottom clamp and the solar panel frame. If the solar panel frame is made of aluminum the second fastener end will pierce through the oxide coating on the top surface of the return flange, making an electrical connection between the solar panel bottom clamp and the solar panel. In order to make a connection between the rail and the solar panel bottom clamp, the end of threaded fastener can optionally be serrated. These serrations can pierce the surface of the rail slot when the threaded fastener is tightened, creating an electrical connection between the mounting rail and the solar panel bottom clamp. The combination of the second fasteners engaging the solar panel bottom clamp with the return flange and the threaded fastener engaging the solar panel bottom clamp and the mounting rail creates an electrical connection between the mounting rail and the solar panel.

This Summary has introduced a selection of concepts in simplified form that are described in the Description. The Summary is not intended to identify essential features or limit the scope of the claimed subject matter.

DESCRIPTION

The terms "left," "right," "top," "bottom," "upper," "lower," "front," "back," and "side," are relative terms used throughout the Description to help the reader understand the figures. In reference to the solar panel bottom clamp, as used throughout this disclosure, "front" refers to the portion of the clamp facing away from the solar panel and away from the mounting rail. Likewise, "rear," refers to the portion of the solar panel bottom clamp that faces into or toward the mounting rail and toward the solar panel. Specific dimensions are intended to help the reader understand the scale and advantage of the disclosed material. Dimensions given are typical and the claimed invention is not limited to the recited dimensions. The use of ordinals such as first, second, or third are used as a naming convention. They does not denote that one feature, embodiment, or structure is superior or inferior to another.

The following terms are used throughout this disclosure and are defined here for clarity and convenience.

Solar Panel Bottom Clamp: As defined in this disclosure, a solar panel bottom clamp is a device that secures the underside (i.e. the return flange) of a solar panel frame to a solar panel mounting device. The solar panel mounting device is typically a mounting rail.

Return Flange: As defined in this disclosure, a return flange is the lower lip portion of a solar panel frame that projects inward underneath the solar panel.

Figure 1:
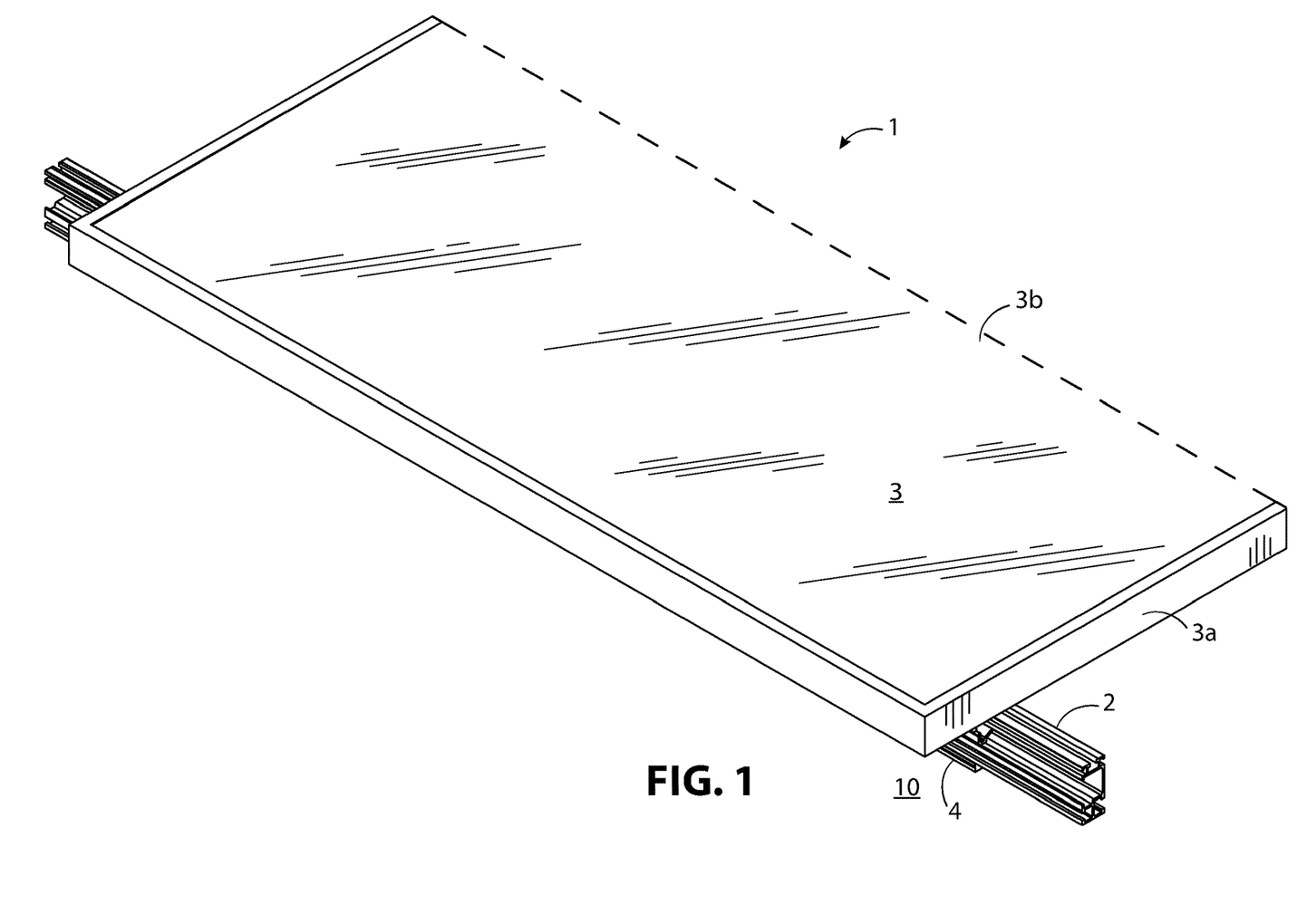
FIG. 1 illustrates a portion of a solar panel mounted to a roof via a mounting rail using the solar panel bottom clamps.

The following description is made with reference to figures, where like numerals refer to like elements throughout the several views. FIG. 1 illustrates a portion of a solar panel assembly 1 mounted to a roof 10 via a mounting rail 2. A solar panel 3, is secured to the mounting rail 2 via solar panel bottom clamp assemblies 4. The solar panel bottom clamp assemblies 4 are mostly hidden from view, creating a clean profile for an observer viewing the solar panel assembly 1. Only a portion of the solar panel 3 is illustrated for the sake of clarity with the boundary of the removed portion represented by a dashed line. The solar panel 3 is illustrated including a solar panel frame 3a surrounding the solar cell assembly 3b. The solar panel frame 3a provides resistance against mechanical loads such as wind and snow and is typically made of a material, such as aluminum or stainless steel, with sufficient stiffness and strength to withstand typical wind pressures and snow loads encountered in typical roof environments.

Figure 2:
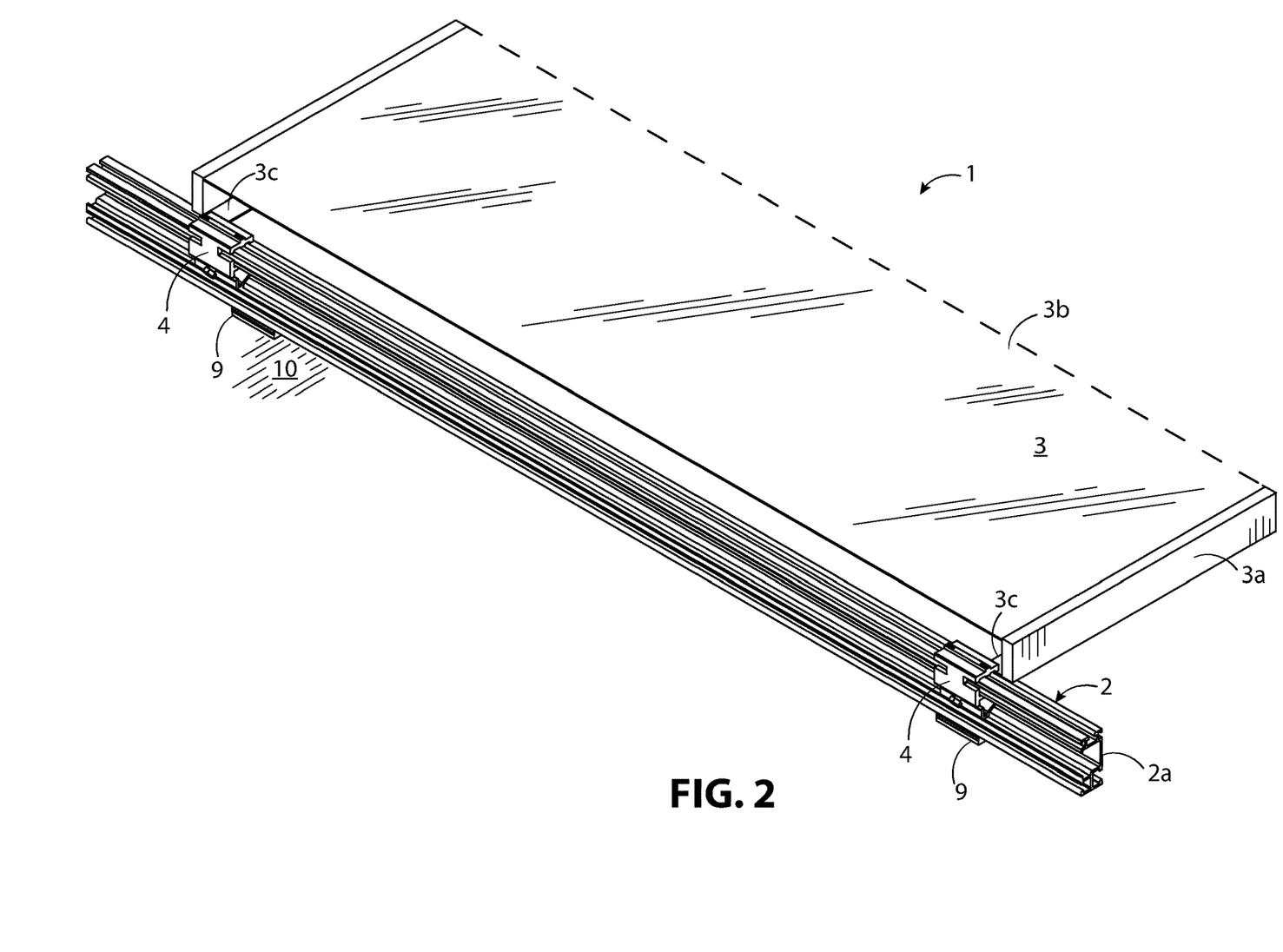
FIG. 2 illustrates the assembly of FIG. 1, with the front of the solar panel frame cutaway, to reveal the mounting rail and solar panel bottom clamps.
Figure 3:
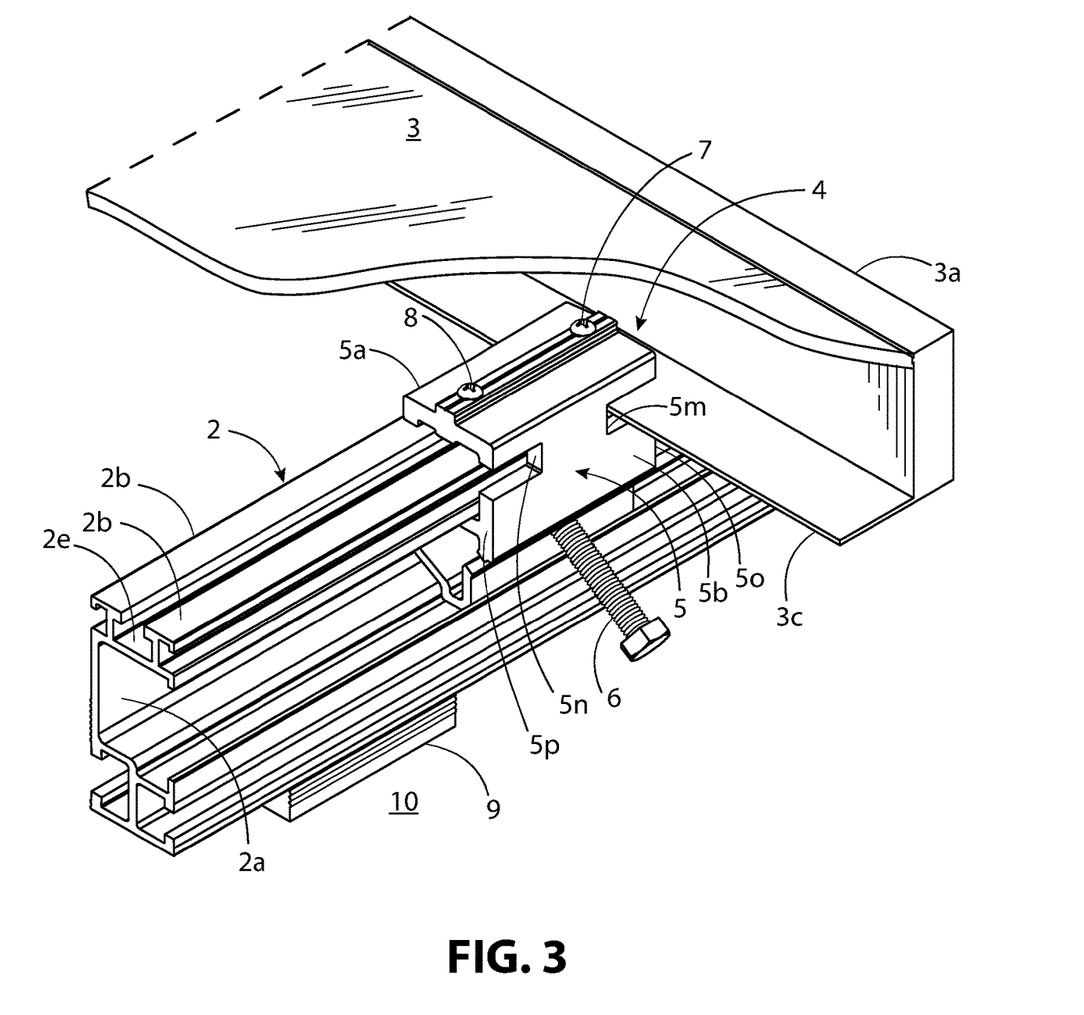
FIG. 3 illustrates, in detail, an enlarged view of a portion of FIG. 1 with the solar panel cutaway to reveal the mounting rail and solar panel bottom clamp, and where the solar panel bottom clamp is loosened to allow positioning of the solar panel relative to the solar panel bottom clamp.
Figure 4:
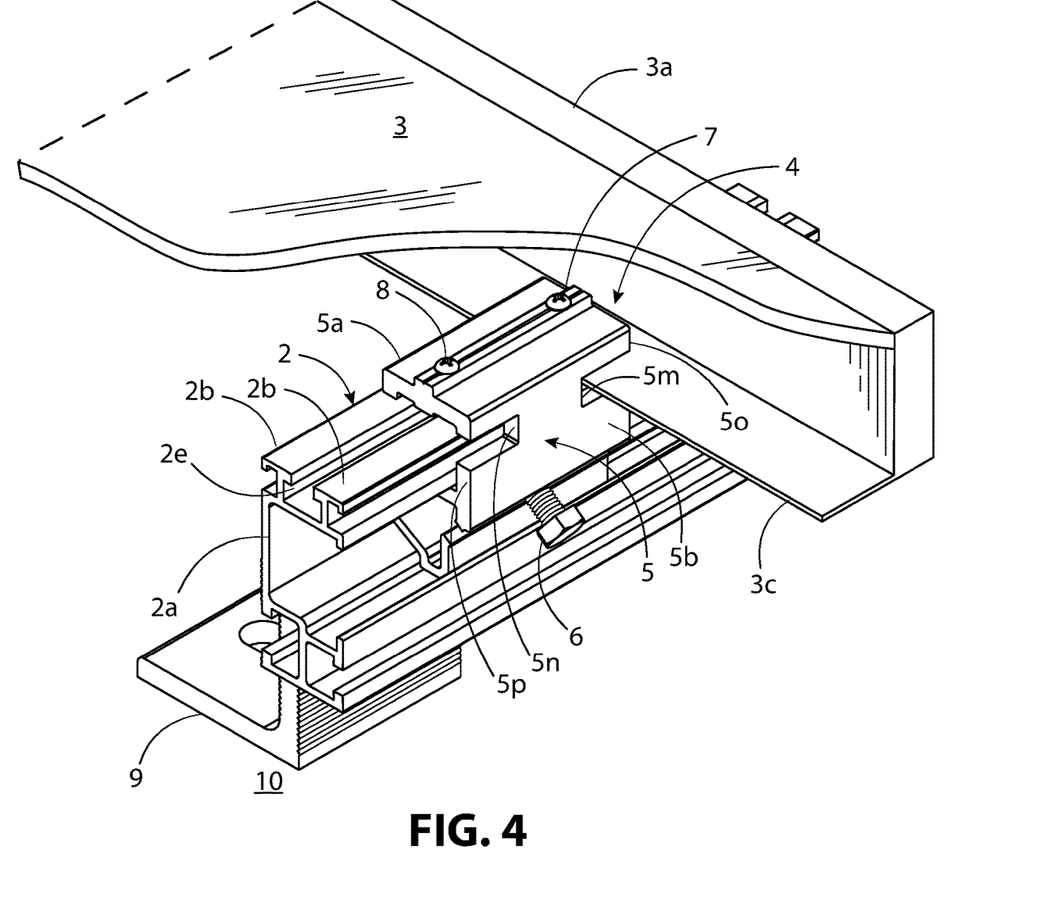
FIG. 4 illustrates an alternative view of FIG. 3 where the solar panel bottom clamp is tightened to secure the solar panel to the mounting rail.

FIG. 2 illustrates the solar panel assembly 1 of FIG. 1 with the front portion of the solar panel frame 3a cutaway to reveal the mounting rail 2 and solar panel bottom clamp assemblies 4. The solar panel bottom clamp assembly 4 is secured to the mounting rail 2 and a return flange 3c of the solar panel frame 3a. A portion of the solar panel bottom clamp assemblies 4 are insertable and slidable anywhere within a slot 2a that is indented lengthwise (i.e., longitudinally) in the outward-facing side of the mounting rail 2. That is, the side of the mounting rail 2 that faces away from the solar panel 3. To view this in more detail, we can refer to FIGS. 3 and 4, which illustrate an enlarged view of a portion of FIG. 1 with the solar panel 3 cutaway to reveal the mounting rail 2 and solar panel bottom clamp assembly 4. Referring to FIG. 3, the solar panel bottom clamp assembly 4 can be slid along slot 2a until it is positioned over the return flange 3c. Referring to FIG. 4 once positioned over the return flange 3c, tightening a threaded fastener 6 presses the upper body 5a of the solar panel bottom clamp 5 downward against the return flange 3c. This presses the return flange 3c downward against the top surface 2b of the mounting rail 2. Thus, securing the solar panel 3 to the mounting rail 2. The threaded fastener 6 of FIGS. 3 and 4 can also be tightened to the rail 2 without the solar panel 3 in place for storage and transportation. Referring to FIGS. 3 and 4, second threaded fasteners 7, 8 are tightened before placing the solar panel bottom clamp assembly 4 against the return flange 3c. This may be pre-tightened by the installer or by the manufacturer. Referring to FIG. 4, when the solar panel bottom clamp 5 is tightened in the rail slot 2a, the second threaded fastener 7 pierces the top surface of the return flange 3c to electrically connect the solar panel bottom clamp 5 to the solar panel frame 3a. In FIGS. 3 and 4, the return flange 3c is illustrated to the right of the solar panel bottom clamp assembly 4. This is because the solar panel bottom clamp assembly 4 is positioned on the right-hand side of the solar panel 3. For solar panel bottom clamp assemblies 4 positioned on the left-hand side of the solar panel 3, second threaded fastener 8 can similarly be used to electrically connect the solar panel bottom clamp 5 to the solar panel 3.

The solar panel bottom clamp assembly 4 described above has several advantages. First, the solar panel bottom clamp assembly 4 is structured so it can be slidably captive within the rail slot 2a where it can be slid into final position. This structure will be described in more detail in the paragraphs that follow. Second, the solar panel bottom clamp 5 can secure the solar panel 3 and itself to the mounting rail 2 by one fastener, for example threaded fastener 6. Third, one or more solar panel bottom clamp assemblies 4 can be preinstalled on the mounting rails at the factory or warehouse, loosened and then slid into final position for installation. This allows the installer to transport fewer parts to the roof 10, simplifies installation and reduces installation time. Fourth, the solar panel bottom clamp assembly 4 is structured to accommodate a wide range of return flange widths. For example, the return flanges 3c of typical commercially available solar photovoltaic panels extends inward from to the outer edge of the solar panel frame 3a by 30 mm (1.18 inches) to 45 mm (1.77 inches). This range can easily be accommodated by the solar panel bottom clamp 5. This simplifies planning and inventory by having one assembly potentially accommodating most or all standard solar panel frame configurations.

Referring to FIGS. 5-10, the solar panel bottom clamp assembly 4 includes solar panel bottom clamp 5 and threaded fastener 6. Referring to FIGS. 5-12, the threaded fastener 6 can be a screw, bolt, or any threaded fastener capable of securing the solar panel bottom clamp 5 to the mounting rail 2 (FIGS. 11 and 12) and withstand wind, snow, and other loads under typical operating conditions or as required by local or national building codes or regulatory agencies. The solar panel bottom clamp 5 is shown as one body, which is typically extruded from aluminum or steel. The solar panel bottom clamp 5 includes an upper body 5a, a mid-body 5b, and a lower body 5c. The mid-body 5b projects upward, directly from the lower body 5c.

Figure 5:
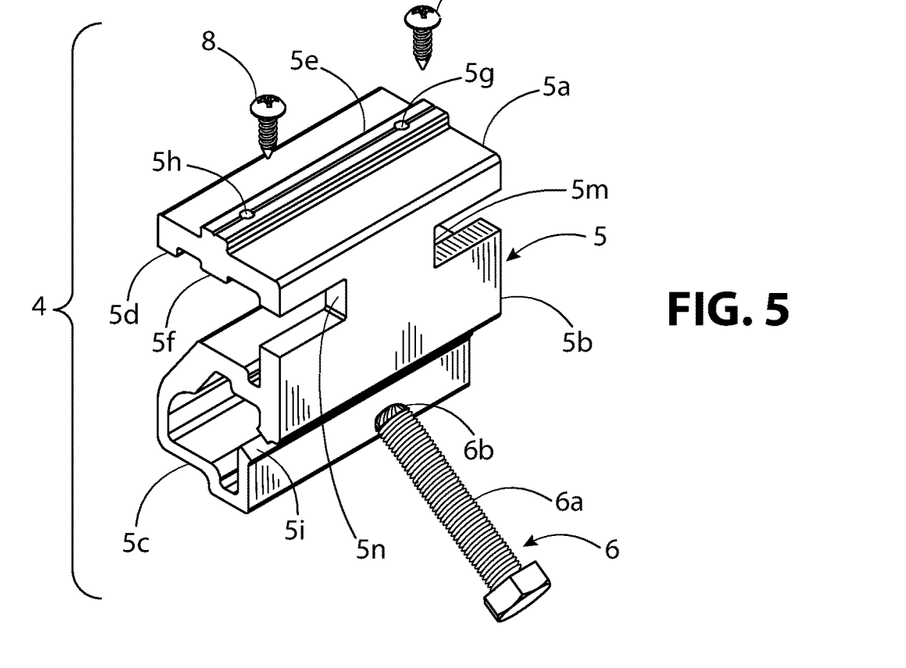
FIG. 5 illustrates a rear and top perspective exploded view of the solar panel bottom clamp assembly.
Figure 6:
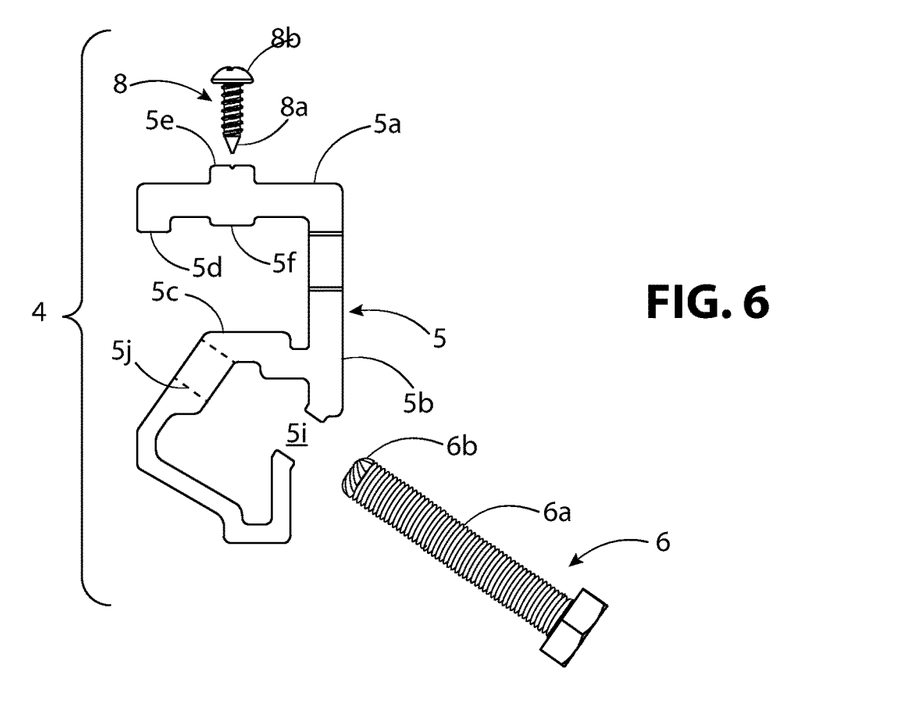
FIG. 6 illustrates a side exploded view of the solar panel bottom clamp assembly.
Figure 7:
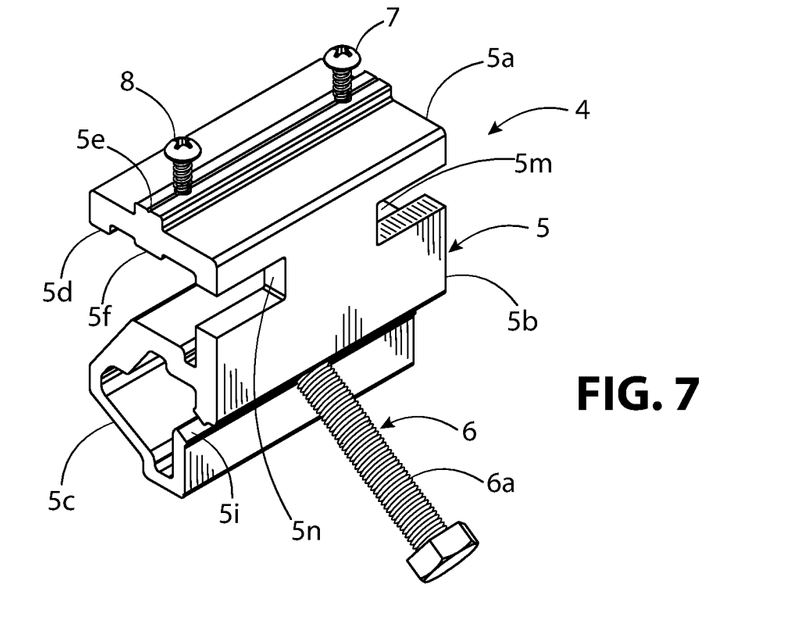
FIG. 7 illustrates a rear and top perspective view of the solar panel bottom clamp assembly with the threaded fastener loosened.
Figure 8:
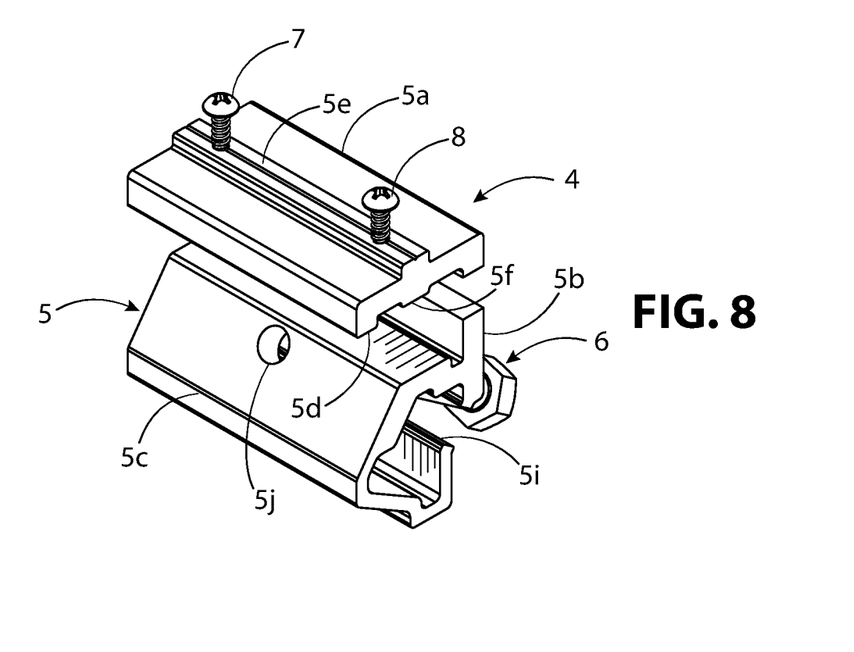
FIG. 8 illustrates a front and top perspective view of FIG. 7.
Figure 9:
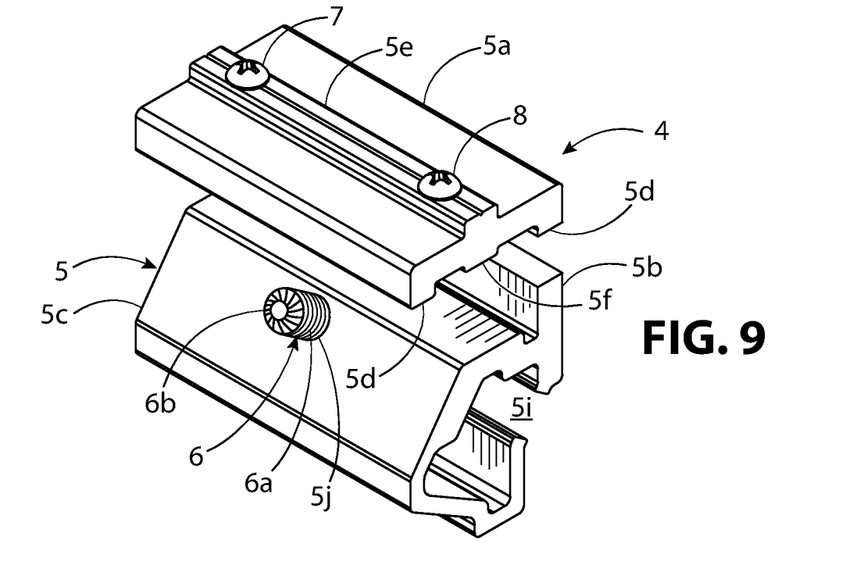
FIG. 9 illustrates a rear and top perspective view of the solar panel bottom clamp assembly with the threaded fastener tightened.
Figure 10:
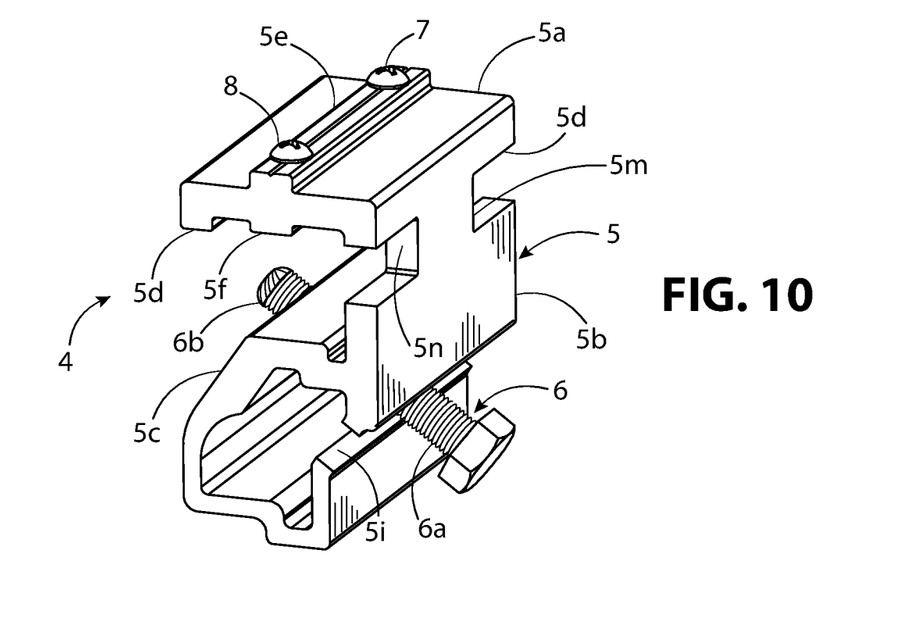
FIG. 10 illustrates a front and top perspective view of FIG. 9.
Figure 11:
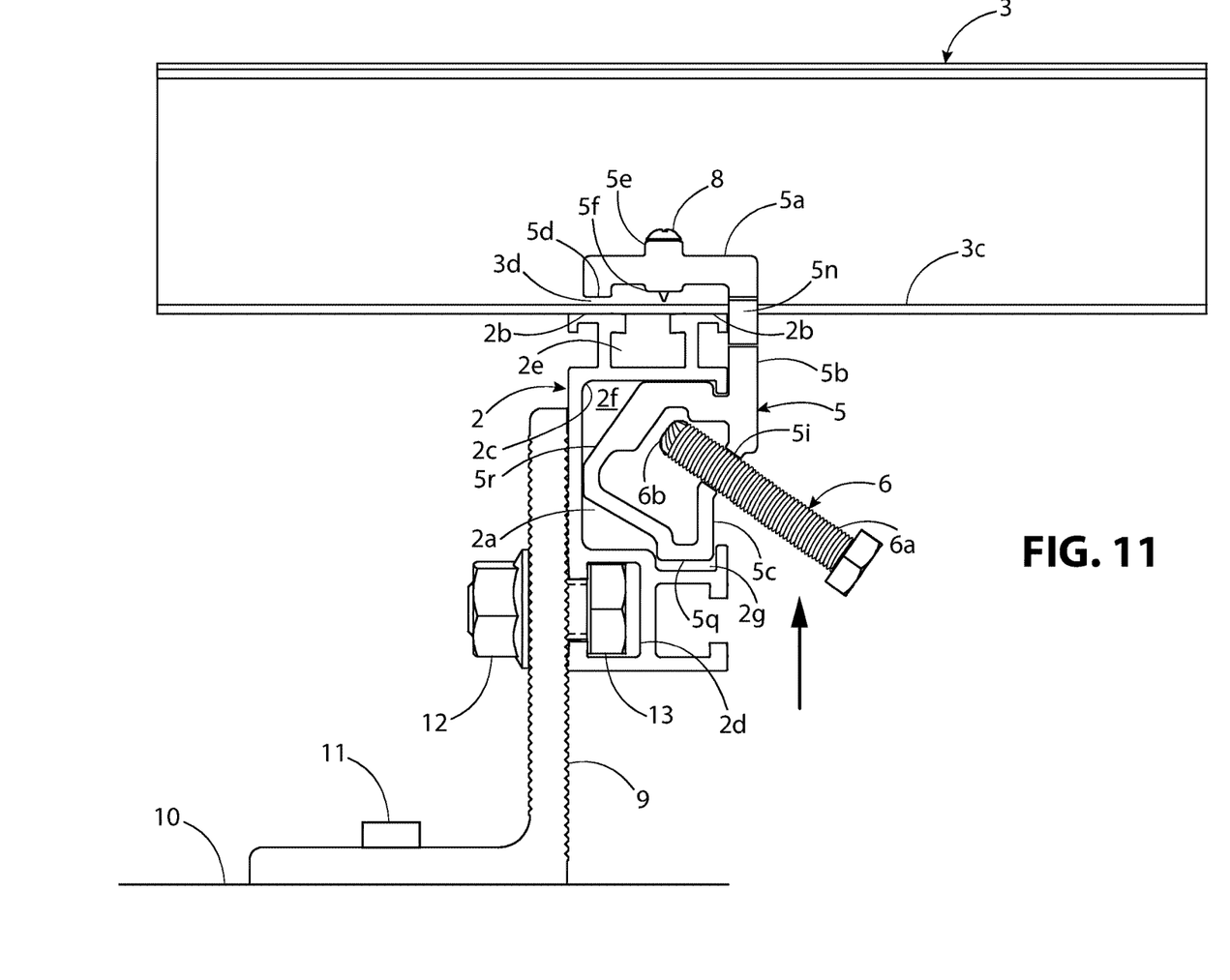
FIG. 11 illustrates a side cutaway view showing the solar panel, solar panel bottom clamp, and mounting rail, with the bottom clamp loosened as in FIG. 3 and with the solar panel bottom clamp pushed up to create a gap between the upper body of the solar panel bottom clamp and the return flange of the solar panel frame.
Figure 12:
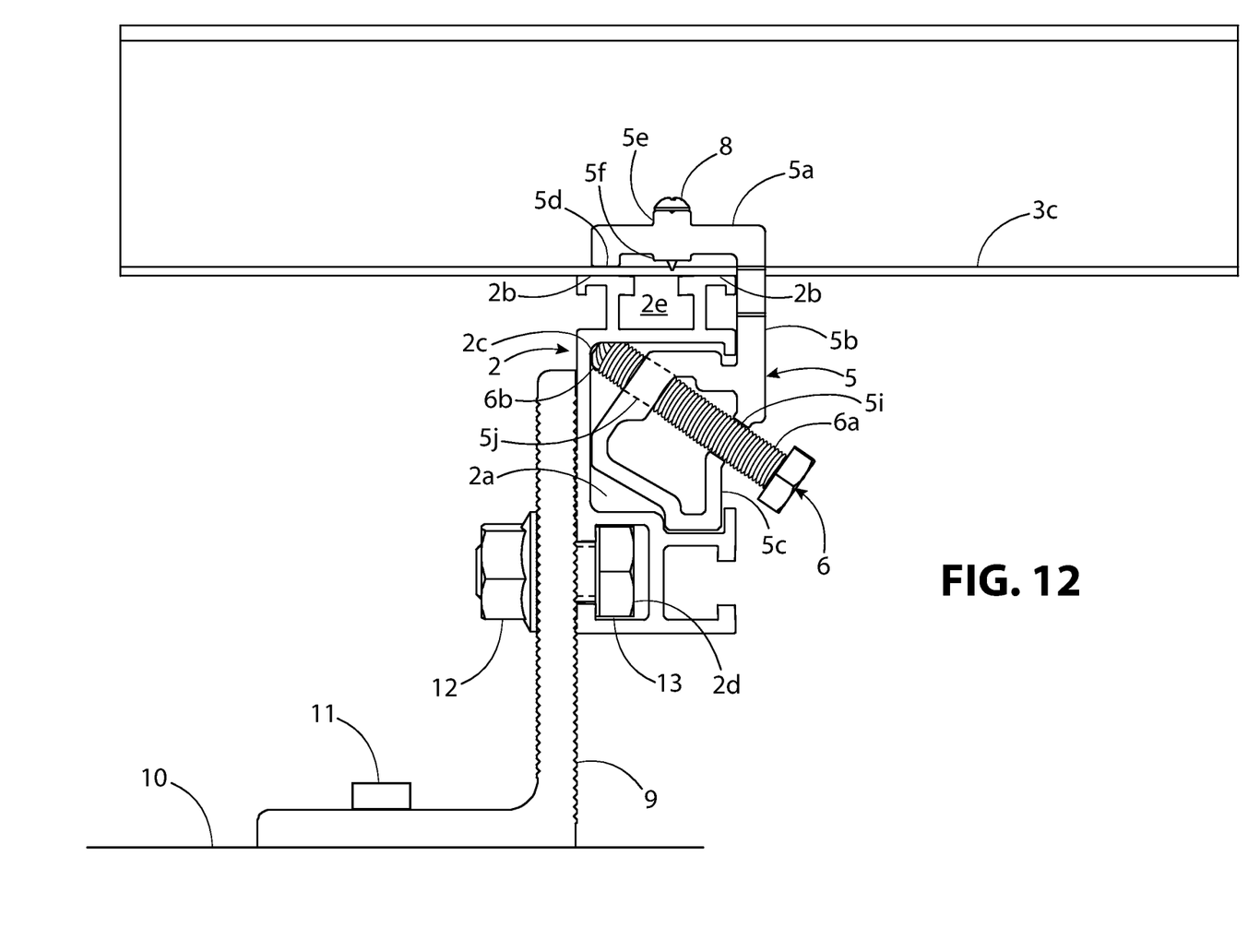
FIG. 12 illustrates a side cutaway view showing the solar panel, solar panel bottom clamp, and mounting rail, with the bottom clamp tightened as in FIG. 4.

Referring to FIGS. 11 and 12, the upper body 5a projects transversely away from the mid-body 5b so that when the lower body 5c is positioned within the slot 2a, the contact surface 5d of the upper body 5a is parallel to the top surface 2b of the mounting rail 2 and parallel to the top and bottom surfaces of the return flange 3c. The contact surface 5d of the upper body 5a being the surface of the upper body 5a that engages the return flange 3c when the threaded fastener 6 is tightened, as illustrated in FIG. 12. In FIG. 11, with the threaded fastener 6 loosened, the solar panel bottom clamp 5 can be moved upward to create a gap 3d between the contact surface 5d and mounting rail 2. This gap 3d allows the upper body 5a to be positioned over the return flange 3c of the solar panel 3. Referring to FIG. 12, once the upper body 5a is positioned over the return flange 3c, tightening the threaded fastener 6 will cause the solar panel bottom clamp 5 to move downward within the slot 2a. This presses the contact surface 5d against the return flange 3c, and the return flange 3c against the top surface 2b of the mounting rail 2. Referring to FIGS. 3 and 4, a first notch 5m extends inward from the first upward-extending edge 5o and a second notch 5n extends inward from the second upward-extending edge 5p of the mid-body 5b both just below the upper body 5a. Referring to FIGS. 3 and 11, the first notch 5m (FIG. 3) and the second notch 5n each create a gap 3d or space below the upper body 5a for the return flange 3c to be positioned or slid under the upper body 5a. The first notch 5m and the second notch 5n are also illustrated in FIGS. 5, 7, and 10. Referring to FIGS. 5-12, the threaded fastener 6 can be positioned diagonally so that a portion of the fastener body 6a (FIGS. 5-7, and 10-12) and fastener end 6b (FIGS. 6, 9, and 10-12) passes through aperture 5i (FIGS. 6, 9, and 10-12) and aperture 5j (FIGS. 6, 8, 9, 12). Aperture 5i is positioned through the front surface of the lower body 5c and aperture 5j is positioned through the rear surface of the lower body 5c. Aperture 5j is shown in FIGS. 6, 8, 9, and 12. Aperture 5j is illustrated as threaded, circular, and sized to threadedly engage the fastener body 6a. Aperture 5i is shown as a slot running through the entire length of the front face of the lower body 5c. The aperture 5i is angled to guide the threaded fastener 6 toward the aperture 5j. The aperture 5i can optionally be structured so that it threadedly engages the threaded fastener 6. Referring to FIG. 12, as the threaded fastener 6 is tightened, the fastener end 6b engages the upper-rear lengthwise edge 2c. This pushes the solar panel bottom clamp 5 downward. The upper-rear corner lengthwise edge is shown in FIG. 11.

Referring to FIG. 11, the shape of the lower body 5c can vary in manner that allows it to remain slidably captive within the rail slot 2a and allows tightening of the threaded fastener 6 to lower the solar panel bottom clamp 5 relative to the mounting rail 2 and create a clamping force between the upper body 5a, the return flange 3c, and the mounting rail 2. The lower body 5c can be sized so when pushed upward, as illustrated in FIG. 11, creates a rail slot gap 2g between the bottom interior surface of the mounting rail 2 and a bottom surface 5q of the solar panel bottom clamp 5. The rail slot gap 2g is greater-than or equal-to the gap 3d between the contact surface 5d of the upper body 5a and the return flange 3c. Referring to FIG. 12, this allows the contact surface 5d to clamp down on the return flange 3c with sufficient force to hold the solar panel 3 against the mounting rail 2. Referring to FIG. 11, the lower body 5c can be shaped to provide a diagonal gap 2f between the lower body 5c and the upper-rear lengthwise edge 2c of the mounting rail 2. This diagonal gap 2f helps allow the threaded fastener 6 to engage the upper-rear lengthwise edge 2c and move the solar panel bottom clamp 5 downward. As shown in FIG. 11, this diagonal gap 2f is facilitated by a diagonally disposed rear surface 5r of the solar panel bottom clamp 5.

The fastener end 6b can be a standard flat or tapered end. The inventor found by experimentation, that a rounded end could help facilitate seating of the threaded fastener 6 against the interior of the rail slot 2a as the threaded fastener 6 is tightened. The rounded end is optional and not an essential feature.

Referring to FIGS. 5-12, the contact surface 5d is illustrated as projecting downward from the end of the upper surface that is away from (i.e., distal from) the junction of the mid-body 5b and the upper body 5a. In some embodiments, for example, embodiments that do not use second threaded fasteners 7, 8, the bottom surface of the upper body 5a could be substantially planar or flat, with the contact surface 5d defining most or all of the bottom surface of the upper body 5a.

Optionally, the assembly includes second threaded fasteners 7, 8 that can be used to electrically connect the solar panel bottom clamp 5 to the return flange 3c of FIGS. 3 and 4. Referring to FIG. 6, in order to facilitate an electrical connection, the second fastener end 8a that is distal to the second fastener head 8b, can be sharp or pointed. This allows the second threaded fastener 8 to penetrate an oxide layer that may have formed on the surface of return flange 3c of FIGS. 3 and 4. Typically, the solar panel frame 3a is formed out of aluminum or anodized aluminum. Aluminum will typically form a non-electrically conductive hard oxide layer on its surface when exposed to the outside elements. The bottom of the fastener head can optionally be serrated or toothed to cut into the top of the solar panel bottom clamp 5 to help assure an electrical connection. Alternatively, and optionally, a star washer or some other serrated washer may be used to accomplish the same result. In FIGS. 5, and 7-10, the second threaded fastener 7, 8 is shown as a pan head sheet metal screw. However, the second threaded fastener 7, 8 can be any threaded fastener capable of creating an electrical connection between the solar panel bottom clamp 5 and the return flange 3c of FIGS. 3 and 4.

In FIGS. 5-12, the second threaded fasteners 7, 8 extend through a first projected portion 5e projecting directly upward from the top surface of the upper body 5a and a second projected portion 5*f* projecting directly downward from the bottom surface of the upper body 5*a*. Referring to FIG. 5, the second threaded fasteners 7, 8 project through threaded apertures 5*g*, 5*h*, respectively. The first projected portion 5*e* and the second projected portion 5*f* project additional length for the threaded apertures 5*g*, 5*h*. This additional length provides additional contact area between the second threaded fastener 7, 8 and the threaded apertures 5*g*, 5*h*, respectively providing for better electrical conductivity between the second threaded fastener 7, 8 and the solar panel bottom clamp 5.

Referring to FIGS. 11 and 12, the threaded fastener 6 can be used to electrically ground the solar panel bottom clamp 5 to the rail 2. This in combination with one or more of the second threaded fasteners 7, 8 can electrically ground the mounting rail 2, solar panel 3, and solar panel bottom clamp 5 together. In order to facilitate an electrical connection between the solar panel bottom clamp 5 and the mounting rail 2, the fastener end 6*b* of the threaded fastener 6 can be made to cut into the rail slot 2*a*. This can be accomplished, for example, by serrating the fastener end 6*b* as illustrated.

Referring to FIGS. 1-4, 11, and 12, the mounting rail 2 can be attached to a roof 10 by a bracket 9 and a roof-attaching fastener 11 (FIGS. 11 and 12). The bracket 9 is shown as an L-bracket but can be any bracket known in the art for attaching a mounting rail 2 for mounting a solar panel 3 to the roof 10. The roof-attaching fastener 11 can be a bolt, lag bolt, screw, or other threaded fastener, or other roof-attaching fasteners capable of securing the bracket 9, solar panel bottom clamp assembly 4, rail 2, and solar panel 3 to the roof 10 and withstand expected wind, rain, and snow loads from the installation environment. Mounting a mounting rail 2 via brackets to roofs to secure solar panels is well known. A person of ordinary skill in the art will readily recognize other equivalents of mounting the mounting rail 2 to a roof 10. Referring to FIGS. 11 and 12, the bracket 9 is shown secured to the rail in a typical arrangement using a nut 12 and bolt 13. The head of the bolt 13 is positioned in a second rail slot 2*d* with the threaded body of the bolt 13 extending through the bracket 9 and threadedly engaging the nut 12 to secure the bracket 9 to the mounting rail 2. While this arrangement is typical, a person of ordinary skill in the art would readily recognize other arrangements for mounting the bracket 9 to the mounting rail 2. For example, the nut 12 could be eliminated by threading the second rail slot 2*d*, seating the head of the bolt 13 against the outward face of the bracket 9 and threadedly engaging the second rail slot 2*d* with the body of the bolt 13. In another example, the bracket 9 can be eliminated by modifying the mounting rail 2 so it can directly mount to the roof 10. For example, the mounting rail 2 can be flanged at the bottom with roof-attaching fasteners 11 extending through apertures or slots in the flange.

A solar panel assembly 1 including a solar panel bottom clamp assembly 4 has been described. It is not the intent of this disclosure to limit the claimed invention to the examples, variations, and exemplary embodiments described in the specification. Those skilled in the art will recognize that variations will occur when embodying the claimed invention in specific implementations and environments. For example, the mounting rail 2 illustrated in FIGS. 3, 4, 11, and 12 show a particular shape to the interior cavity of the rail slot 2*a*. This shape can be varied in accordance to design and manufacturing requirements. The shape of the lower body 5*c* of the solar panel bottom clamp 5 will likewise vary in manner that allows it to remain slidably captive within the rail slot 2*a* and allows tightening of the threaded fastener 6 to lower the solar panel bottom clamp 5 relative to the mounting rail 2 and create a clamping force between the upper body 5*a*, the return flange 3*c*, and the mounting rail 2. The mounting rail 2 is illustrated as including other features such as a second rail slot 2*d* for mounting hardware such as bolt 13 in FIGS. 11 and 12. Referring to FIGS. 11 and 12, the mounting rail 2 is shown as including a third rail slot 2*e* indented lengthwise in the top surface 2*b* of the mounting rail 2. These features are optional and are illustrated to show what is typical. For example, the third rail slot 2*e* could be eliminated making the top surface 2*b* of the mounting rail 2 a continuous surface.

This disclosure describes using the solar panel bottom clamp assembly 4 to mount the solar panel 3 to the mounting rail 2. In FIGS. 1-4, 11, and 12, the rail 2 is illustrated as being mounted to a roof 10. This is meant to illustrate one possible mounting environment. The solar panel bottom clamp assemblies 4 themselves, and how the solar panel bottom clamp assemblies 4 secure the solar panel 3 and solar panel return flange 3*c* to the mounting rail 2, do not depend on what the mounting rail 2 itself is secured to. It is the inventor's intent that the inventive concept not be limited to a roof 10 or any particular mounting environment. The inventor envisions that the mounting rail 2 can be also mounted to many other mounting environments, for example, the mounting rail 2 can attach to ground mounted solar panel structures as well as other surfaces not necessarily associated with roofs. For example, the mounting rail 2 can be mounted to a ground-mounted fixed or tracking solar panel structure via clamping devices such as u-shaped clamps. Any reference to a roof or roofs in the preamble of the claims, for example, "A device for attaching a solar panel to a roof . . . ," is meant as a statement of intended use. This is not meant to limit the claimed structure to being mounted to a roof.

The claims are not to be interpreted as including means-plus-function limitations unless a claim explicitly evokes the means-plus-function clause of 35 USC § 112(f) by using the phrase "means for" followed by a verb in gerund form.

"Optional" or "optionally" is used throughout this disclosure to describe features or structures that are optional. Not using the word optional or optionally to describe a feature or structure does not imply that the feature or structure is essential, necessary, or not optional. Discussing advantages of one feature over another, or one implementation or another conceived by the inventor, does not imply that the feature or implementation is essential. Using the word "or," as used in this disclosure is to be interpreted as the Boolean meaning of the word "or" (i.e., an inclusive or) For example, the phrase "A or B" can mean: A without B, B without A, A with B. For example, if one were to say, "I will wear a waterproof jacket if it snows or rains," the meaning is that the person saying the phrase intends to wear a waterproof jacket if it rains alone, if it snows alone, if it rains and snows in combination.

While the examples, exemplary embodiments, and variations are helpful to a person of ordinary skill in the art in understanding the claimed invention, it should be understood that the scope of the claimed invention is defined solely by the following claims and their equivalents.

What is claimed is:

1. A device for attaching a solar panel to a roof, the solar panel including a return flange, comprising:
   a mounting rail including a rail slot indented lengthwise along an outward-facing side of the mounting rail;
   a solar panel bottom clamp including a lower body, a mid-body projecting upward from the lower body, and an upper body projecting transversely from the mid-body, the lower body shaped and sized to captively slide within the rail slot;

a threaded fastener; and with the return flange resting on a top surface of the mounting rail, the lower body being positioned within the rail slot, the upper body being positioned over the return flange, and the threaded fastener being positioned diagonally upward through the mid-body and the lower body, tightening the threaded fastener against the rail slot causes the upper body to move downward and engage the return flange thereby securing the solar panel to the mounting rail.

2. The device of claim 1, wherein the mid-body includes a notch extending inward from an upward-extending edge of the mid-body and creating a gap below the upper body for the return flange to be positioned.

3. The device of claim 2, further comprising:

a second threaded fastener including a second fastener end positioned through the upper body; and the threaded fastener, when tightened against the rail slot causes the second fastener end to pierce the return flange causing an electrical connection between the solar panel bottom clamp and the return flange.

4. The device of claim 1, further comprising:

a second threaded fastener including a second fastener end positioned through the upper body; and the threaded fastener, when tightened against the rail slot causes the second fastener end to pierce the return flange causing an electrical connection between the solar panel bottom clamp and the return flange.

5. The device of claim 1, wherein the threaded fastener includes a head and a fastener end that is distal to the head and where the fastener end is rounded.

6. The device of claim 1, wherein the mid-body includes:

a first upward-extending edge and a second upward-extending edge opposing the first upward-extending edge;

a first notch extending inward from the first upward-extending edge and a second notch extending inward from the second upward-extending edge each of the first notch and the second notch creating a gap below the upper body for the return flange to be positioned.

7. A device for attaching solar panel to a roof, the solar panel including a return flange, the return flange resting on a top surface of a mounting rail, the mounting rail including a rail slot indented lengthwise along an outward-facing side of the mounting rail, comprising:

a solar panel bottom clamp including a lower body, a mid-body projecting upward from the lower body, and an upper body projecting transversely from the mid-body, the lower body being shaped and sized to captively slide within the rail slot;

a threaded fastener; and with the lower body being positioned within the rail slot, the upper body being positioned over the return flange, and the threaded fastener being positioned diagonally upward through the mid-body and the lower body, tightening the threaded fastener against the rail slot causes the upper body to move downward and engage the return flange thereby securing the solar panel to the mounting rail.

8. The device of claim 7, wherein the mid-body includes a notch extending inward from an upward-extending edge of the mid-body and creating a gap below the upper body for the return flange to be positioned.

9. The device of claim 8, further comprising:

a second threaded fastener including a second fastener end positioned through the upper body; and the threaded fastener, when tightened against the rail slot causes the second fastener end of the second threaded fastener to pierce the return flange causing an electrical connection between the solar panel bottom clamp and the return flange.

10. The device of claim 7, further comprising:

a second threaded fastener including a second fastener end positioned through the upper body; and the threaded fastener, when tightened against the rail slot causes the second fastener end of the second threaded fastener to pierce the return flange causing an electrical connection between the solar panel bottom clamp and the return flange.

11. The device of claim 7, wherein the threaded fastener includes a head and a fastener end that is distal to the head and where the fastener end is rounded.

12. The device of claim 7, wherein the mid-body includes:

a first upward-extending edge and a second upward-extending edge opposing the first upward-extending edge;

a first notch extending inward from the first upward-extending edge and a second notch extending inward from the second upward-extending edge each of the first notch and the second notch creating a gap below the upper body for the return flange to be positioned.

\* \* \* \* \*